(12) United States Patent
Rugel

(10) Patent No.: US 10,343,453 B2
(45) Date of Patent: Jul. 9, 2019

(54) DEVICE AND METHOD FOR FIXING A WHEEL SPOKE

(71) Applicant: Christoph Rugel, Freiburg (DE)

(72) Inventor: Christoph Rugel, Freiburg (DE)

(*) Notice: Subject to any disclaimer, the term of this patent is extended or adjusted under 35 U.S.C. 154(b) by 510 days.

(21) Appl. No.: 14/813,297

(22) Filed: Jul. 30, 2015

(65) Prior Publication Data

US 2016/0031263 A1 Feb. 4, 2016

(30) Foreign Application Priority Data

Aug. 1, 2014 (EP) ..................................... 14179418

(51) Int. Cl.
*B60B 31/02* (2006.01)
*B60B 31/00* (2006.01)
*B60B 1/00* (2006.01)
*B60B 1/02* (2006.01)
*B60B 1/04* (2006.01)

(52) U.S. Cl.
CPC ............ *B60B 31/02* (2013.01); *B60B 31/005* (2013.01); *B60B 1/003* (2013.01); *B60B 1/02* (2013.01); *B60B 1/041* (2013.01); *B60B 2320/00* (2013.01)

(58) Field of Classification Search
CPC ... B60B 31/02; B60B 31/005; B60B 2320/00; B60B 1/02; B60B 1/003; B60B 1/041
See application file for complete search history.

(56) References Cited

U.S. PATENT DOCUMENTS 982,259 A 1/1911 Einfeldt

FOREIGN PATENT DOCUMENTS

| EP | 0476749 A1 | 3/1992 |
|---|---|---|
| WO | 2008007954 A1 | 1/2008 |
| WO | 2011084052 A1 | 7/2011 |

*Primary Examiner* — Moshe Wilensky
(74) *Attorney, Agent, or Firm* — Wagenknecht IP Law Group, PC

(57) ABSTRACT

Devices and methods for fixing a spoke of a running wheel in the context of trueing, an exemplary device having a clamp (1) with a clamping gap (4) of variable width and a longitudinal axis (L) configured to receive a section of the spoke, wherein driving the clamp (1) narrows the clamping gap (4) so that the section of the spoke can be fixed via force-fitting and/or form-locking, further wherein the device rotationally fixes the section but permits movement of the section in the longitudinal direction.

15 Claims, 6 Drawing Sheets

DEVICE AND METHOD FOR FIXING A WHEEL SPOKE

CROSS REFERENCE TO RELATED APPLICATIONS

This invention claims priority to European Patent Application serial no. EP 14179418 filed Aug. 1, 2014; the content of which is herein incorporated by reference in its entirety.

TECHNICAL FIELD

The invention relates to the field of devices for centering wheels with spokes. More specifically, the invention relates to a device for fixing a wheel spoke during tensioning.

BACKGROUND OF THE INVENTION

Wheels with spokes are known to serve for a long time. They essentially have three main components, namely, a hub, spokes and a rim. The hub, which is arranged in the center of the running wheel, is connected to the rim by a plurality of spokes. Tightening the spokes along the circumference of the rim with tensile force gives the wheel a high degree of rigidity. The spokes, which usually absorb only tensile forces, are hooked in the hub in eyelets or something similar, with typically a bend at the proximal (hub side) end. At its distal (rim-side) end they have a thread on the contrary. This works together with a so-called spoke nipple (or shortly nipple), which is rotatably mounted in the rim. The nipple has an internal thread, which can accommodate the distal external thread of the spoke. Turning the nipple changes the total length of the existing combination of nipple and spoke, which extends or shortens the spoke. That way, the spoke tension can change.

The change (initially in particular increasing) of spoke tension is not only initially necessary, e.g. for "lacing" of the first particulate wheel kit, but also for setting a desired spoke tension and in particular the so-called "centering", which means the process of eliminating side impact and radial runout of the rim, as it occurs both after assembly of the running wheel, as well as through constant use. By centering, and thus tensing or relaxing the spokes, the tensile force on the rim is locally reduced or increased, which leads to a corresponding change in geometry.

Different tools are known for performing the centering operation.

When manually centering, the user controls visually, preferably with the aid of limit stops, sections of the running wheel for centering errors. A key or spoke wrench is used for a spoke tension, whereby the nipples of the respective spokes are rotated manually and the results are kept under a constant review. Therefore typically several wheel rotations are required until the result is satisfactory. Wheel alignment machines offer the possibility to fix a single wheel by its hub, and they have in the area corresponding to the rim limit stops, which allow for the convenient control of the lateral and radial runout. A disadvantage of such manual solutions, however, is the relatively high expenditure of time and the need for an appropriately skill user during the centering.

Therefore, partially or fully automatic tools have been developed to carry out the control of lateral and radial runout and the resulting adjustments automatically. Such a device is known for example from the document WO 2006 114087 A2. This includes an axle support for a running wheel, a drive roll for the same, a device for detecting local lateral and radial runout, as well as a device for the automated spoke nipple rotation. The measured values of the rim are transmitted to a processing unit, which determines the proper rotation direction and number of rotations. These values are then used to control the automatic turning of the spoke nipple.

A fundamental problem occurring in changing of the spoke tension is the presence of frictional forces on the thread. To rotate the nipple relative to the spoke, at first, the static friction of the thread has to be overcome. Both here and in the subsequent sliding friction, the attrition forces can counteract a movement of the nipple in the thread, so that not only the nipple but also the spoke itself rotates around its longitudinal axis, whereby a torsional stress is generated. The spoke twists until its "breakaway" and can now accommodate pure tensile forces due to the torque acting on the spoke nipples. A twisted spoke is undesirable for several reasons: for example, the torsion leads to a sub-optimal resting of the proximal end in the eyelet of the hub, which can lead to a spoke breakage. As another example, a twisted spoke tends, during strong vibrations that typically occur during driving, again in the repeated spontaneous "breakaway" from the nipple, resulting in an unscrewing and simultaneous relaxation of the spoke; an unintended reduction of the spoke tension and an increase in the lateral or radial runout are the result. Even in case when the twisted spoke along with the nipple performs a common, torsion reducing rotary motion (e.g. due to vibration), there is an extension of the (then a little less twisted) spoke as a result.

In order to avoid this effect, or at least to minimize it, experts deliberately slightly widen ("overturn") the rotational movement of the nipple than initially necessary, and immediately afterwards execute a slight rotational movement in the opposite direction.

During the minor reverse rotation the spoke indeed does not change its position in the thread of the nipple due to the thread friction, but it is brought from the first twisted location in a "neutral" position in which only tensile forces act. It is clear that this method requires an appropriate experience of a manually working user. The above-mentioned automated device is also able to perform appropriate compensating movements, but it also increases time and computational effort, especially since in a non-twisted spoke, the spoke tension can be determined in a particularly simple manner. A most uniform tension of all spokes in turn is a sign of quality with regard to a sustainable balance of forces of the running wheel with a lower tendency to axial and radial offsets as well as increased stability of the spokes.

Another way to reduce the adverse effect of the frictional forces in the threads and the related co-rotation of the spoke about its longitudinal axis is disclosed in document WO 2008 007 954 A1. This publication describes an automatically working centering device for running wheels with spokes. This includes a clamp for a spoke so that the spoke cannot rotate during the rotation of the spoke nipple. This already leads to an improvement of the working result.

BRIEF SUMMARY OF THE INVENTION

The object of the invention is to further improve the working result, as well as reduce time loss and the computational efforts with regard to the above-described steps of the compensation movement.

The object is achieved by a device for fixing a spoke for trueing a wheel, the device having a clamp with a clamping gap of variable width and a longitudinal axis configured to receive a section of the spoke, wherein driving the clamp narrows the clamping gap so that the section of the spoke can be fixed via force-fitting and/or form-locking, further wherein the device rotationally fixes the section but permits movement of the section in the longitudinal direction.

In some embodiments the clamp has clamping surfaces which are moveable in direction of the longitudinal axis of the clamping gap. The clamp can have two clamping jaws, which respectively have a clamping surface. The clamping jaws can be spaced apart with their clamping surfaces forming the clamping gap. In some embodiments both clamping jaws are linearly moveable and supported in such a manner that they can be moved in parallel towards, and away from, each other with their clamping surfaces, and cooperate with gearing that is configured for the synchronous-opposite movability of both clamping jaws. The clamping jaws can be movably supported around a common rotation axis such that they are moveable at an angle towards, and away from, each other with their clamping surfaces, and cooperate with gearing which is configured for the synchronous-opposed movability of both clamping jaws.

The gearing can include an eccentric shaft with a multitude of disengagement profiles being alternating-eccentrically arranged to a core of the eccentric shaft, the disengagement profiles cooperating with transducer surfaces of two transducers which are bi-laterally arranged with respect to the eccentric shaft, wherein the transducers are mechanically coupled to the clamping jaws such that their movements result in synchronous-contrary movements of the clamping jaws. In some embodiments along the circumference of the core, the respective disengagement profiles have a disengagement surface which lies eccentric to the rotation axis of the core.

In some embodiments the device also includes a drive, which directly or indirectly cooperates with the clamp.

In a related embodiment of the invention, equipment for the automatic building and/or trueing of wheels and/or for the adjusting of the tension of their spokes is provided, which includes a device for fixing a spoke as provided herein. In some embodiments equipment for the semi-automatic adjusting of the tension of wheel spokes is provided, which includes the device for fixing a spoke as disclosed herein; a device for measuring spoke tension; and an automated nipple screwing mechanism.

In another related embodiment, a method for adjusting tension of wheel spokes is provided, which includes fixing a spoke that is connected to a spoke nipple in rotational direction around its longitudinal axis at least along a spoke section and permitting movement of the spoke longitudinally; and turning the spoke nipple using automation.

In some embodiments, prior to fixing the spoke, the method further includes measuring a side and radial runout at least at the position of the spoke nipple, and prior to or during the fixing the spoke, but prior to the automated turning, a number of spoke nipple revolutions necessary for reducing the respective side or radial runout is determined, and in that during the fixing, the automated turning according to the previously carried out determination takes place. In some embodiments the method also includes measuring the tension of the spoke, and determining the number of revolutions of the spoke nipple connected to the spoke is necessary for reaching a predetermined tension prior to the automated turning.

In another related embodiment, the invention provides a method for adjusting tension of wheel spokes, which includes, providing a device as provided herein; fixing a spoke that is connected to a spoke nipple in rotation direction around its longitudinal axis at least along a spoke section and permitting movement of the spoke longitudinally; and turning the spoke nipple using automation.

BRIEF DESCRIPTION OF THE DRAWINGS

Embodiments of the invention can be better understood with reference to the following drawings, which are part of the specification and represent preferred embodiments. Like reference numerals designate corresponding parts throughout the several views.

DETAILED DESCRIPTION OF PREFERRED EMBODIMENTS

The device according to the invention will be described first. This is followed by a description of the method according to the invention.

The device fixes the spoke of a wheel for improved tension adjustment, for the purpose of adjusting the tension or centering the running wheel or simply to adjust the tension of the spoke. As already introduced above, changing the spoke tension is accompanied by rotating the spoke nipple connected to the spoke.

The above is accomplished using a device including a clamp with a clamping gap of variable width and with a longitudinal axis, in which a section of the spoke can be received. It is clear that the width of the clamping gap must slightly exceed the thickness of the spoke to which the section is to be affixed, so that the spoke can be brought into the clamping gap. Since spoke nipples are arranged in the rim of most wheels, it is preferable that the distal portion which is to be fixed (i.e., in the vicinity of the rim); for the case in which the spoke nipple is positioned in the hub, the portion is preferably proximal (which means, near the hub).

Furthermore, by driving the clamp, the clamping gap can be narrowed so that the section of the spoke can be affixed via force-fitting and/or form-locking.

The spoke section is preferably rotationally fixed in the proximity of the spoke nipple while remaining moveable along the longitudinal direction. Thus, the clamp prevents rotation of the spoke while rotating the spoke nipple, and the shortening or lengthening of the tensioned spoke exerts no force onto the clamp along the longitudinal axis of the spoke. So, the spoke tension can already be precisely and smoothly held in place while turning the nipple on the spoke; loaded only with tensile forces, with both a subsequent adjustment of the spoke tension and a subsequent change in tension dispensed by setting of the twisted spoke. Thus, the method and device simplify and shorten adjustment work and improve the quality and durability of a tension-optimized running wheel.

The invention is now explained in detail by the aid of the drawings.

Figure 1:
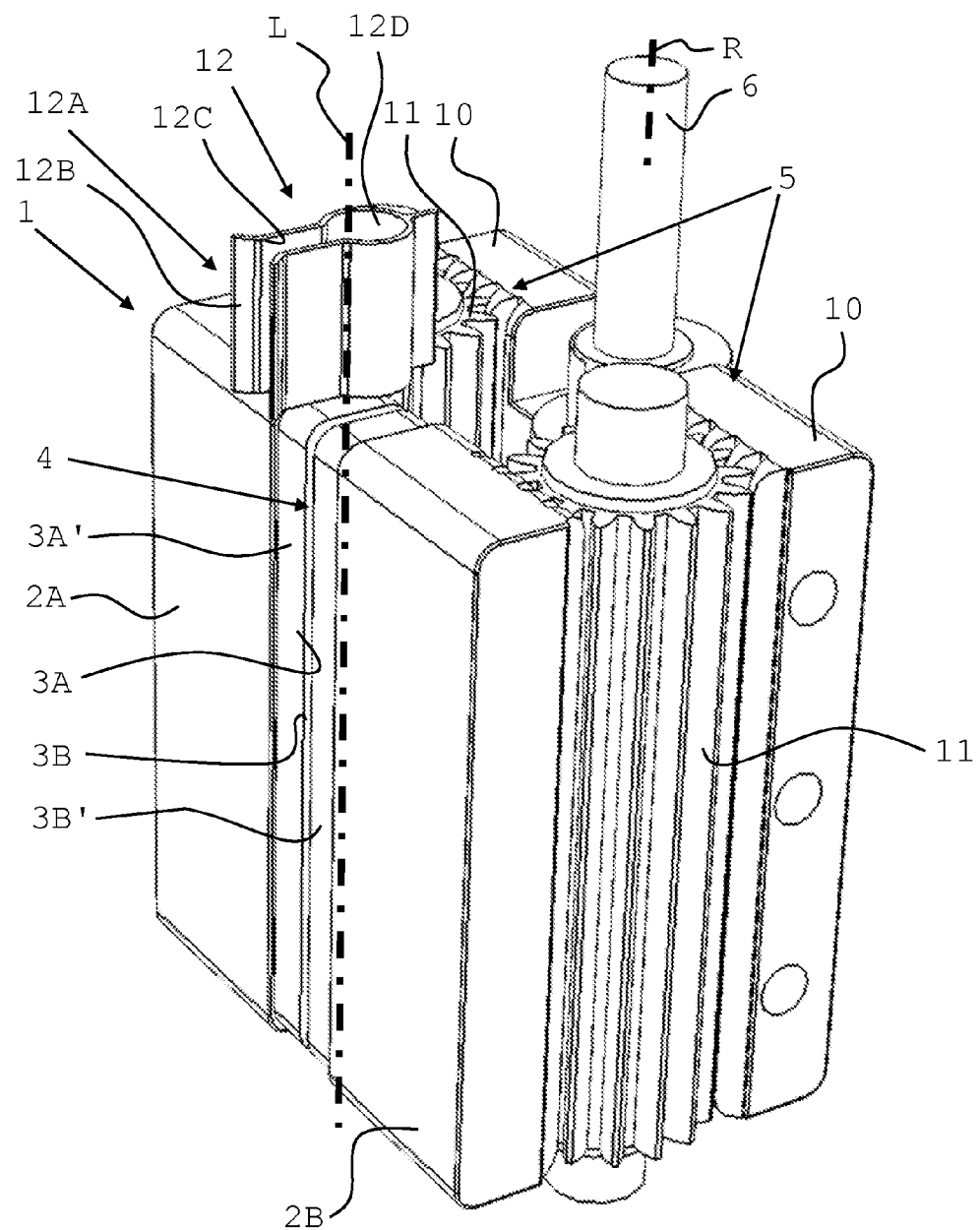
FIG. 1 is a schematic showing a front view of a first embodiment of a device according to the invention.
Figure 2:
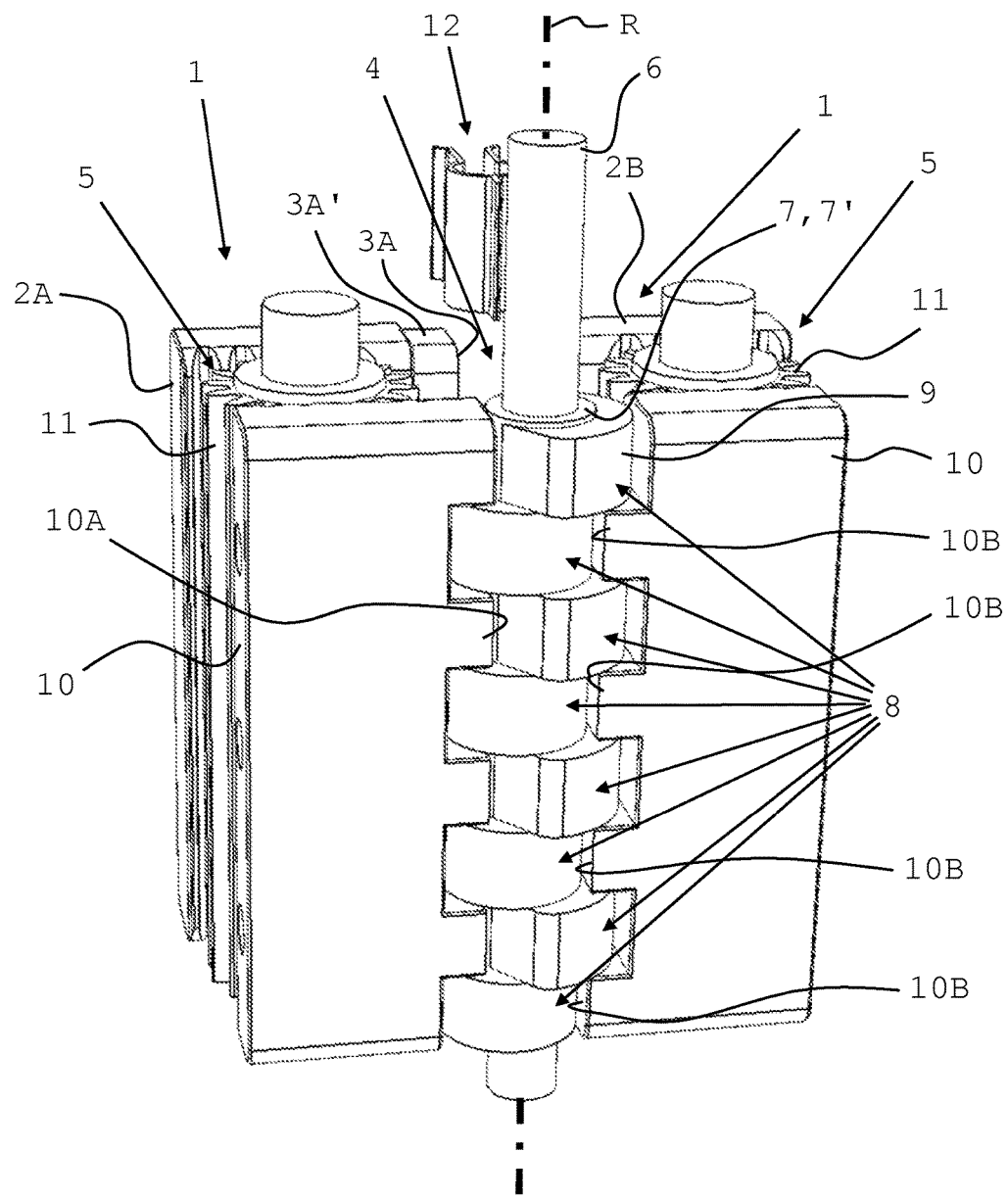
FIG. 2 is a schematic of a back view of the device of FIG. 1.

FIG. 1 and FIG. 2 depict an embodiment of the device according to the invention shown obliquely from the front (FIG. 1) or at an angle from the back (FIG. 2) in a perspective view. FIG. 1 shows the device with largely approximated clamping jaws (small gap 4), FIG. 2 with nearly most distanced clamping jaws (large gap 4). Accordingly, the clamp 1 has two clamping jaws 2A, 2B, each having a clamping surface 3A, 3B for the spoke (not shown). In this case, the clamp 1 is configured in such a way that between the clamping surfaces 3A, 3B, the abovementioned clamping gap 4 for the spoke (not shown) results, whose longitudinal axis runs approximately collinear with or at least parallel to the longitudinal axis L of the clamping gap 4. The clamping surfaces 3A, 3B which limit the clamping plates 3A', 3B' in the direction of the clamping gap 4 are mounted displaceably in the direction of the longitudinal axis L of the clamping gap 4 (not shown). This can for example be achieved in that the clamping surfaces 3A, 3B are movably connected with the clamping jaws 2A, 2B in the direction of the clamping gap 4 via a linear sliding bearing, e.g. via a cage ball bearing supported in the clamping jaws 2A, 2B. By suitable choice of materials and material shapes such as e.g. elastic material for the clamping surfaces 3A, 3B, a frictional engagement even with spokes having slightly different cross-sections (e.g. "butted spokes") can be achieved without having to provide specially shaped clamping surfaces 3A, 3B.

According to an embodiment which is not shown but encompassed herein, the clamping device includes a different number of clamping jaws. For example, it can be integrally designed as tongs or as a loop that is wrapped around the spoke and then tightened. Even broken jaws, or those that fix the spoke like a chuck of three or four sides, are possible as long as the spoke may be brought into the clamping gap without loosening the nipple.

According to some embodiments, both jaws 2A, 2B are linearly movable and supported so that they are movable with their clamping surfaces 3A, 3B parallel towards and away from each other. For this purpose they can, as also visible in FIG. 1 and FIG. 2, have teeth acting in the longitudinal direction L of the clamping gap 4, by means of which they accordingly cooperate with gearing 5 set up for the synchronous opposite movability of both clamping jaws 2A, 2B which allows for the longitudinal axial movability of the clamping plates 3A', 3B'.

Such construction causes a gentle bearing movement (bearing not shown). The task of the gear 5 is therefore a transfer of movement coming from another component onto the clamping jaws 2A, 2B. It is clear that in case of another embodiment which is not shown but also encompassed, the clamping jaws do not necessarily have to be supported linearly movable, for example, in the case of a pincer movement (see above).

Figure 7:
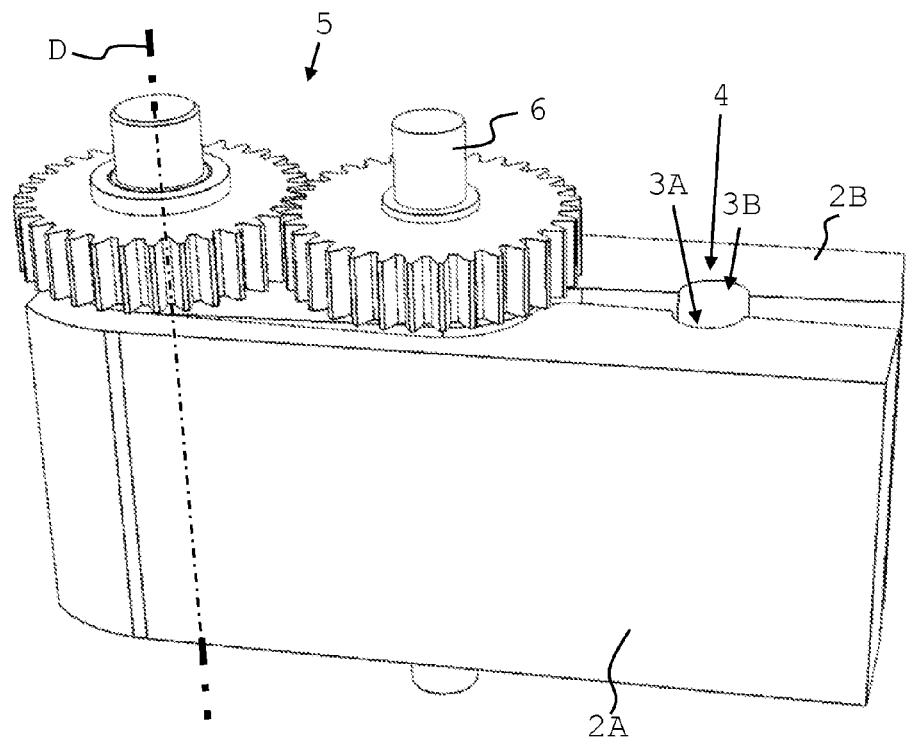
FIG. 7 is a schematic showing a second embodiment of a device according to the invention.
Figure 8:
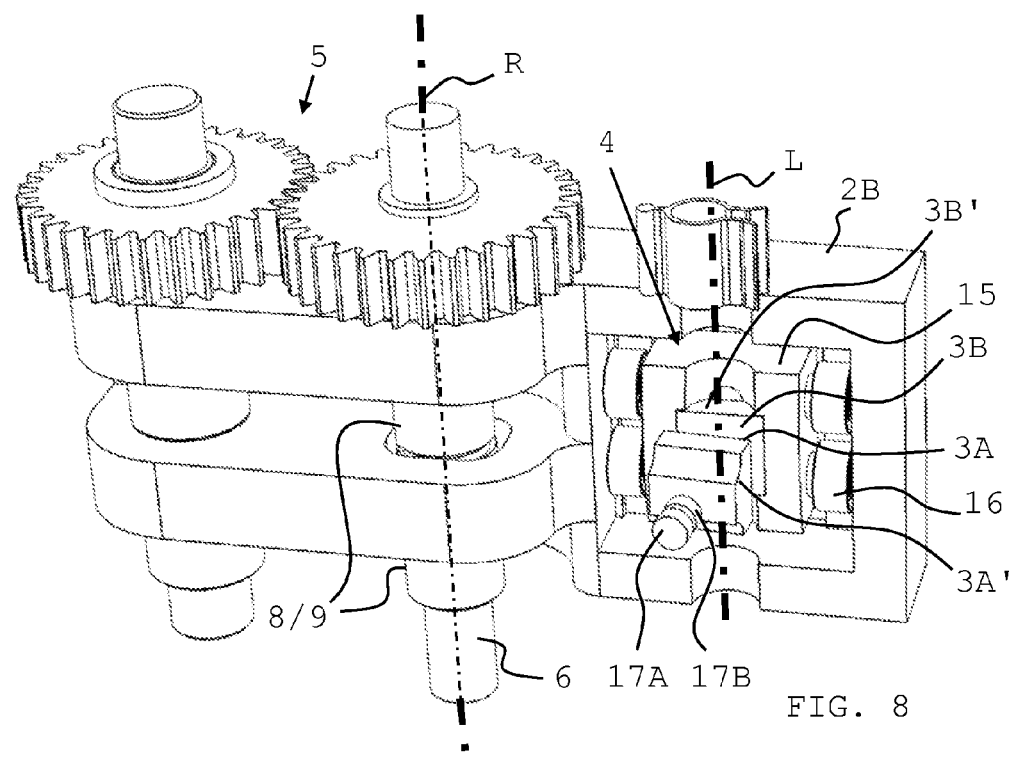
FIG. 8 is a schematic detailing clamping plates held as insets in receptacles and linearly movable together.
Figure 9:
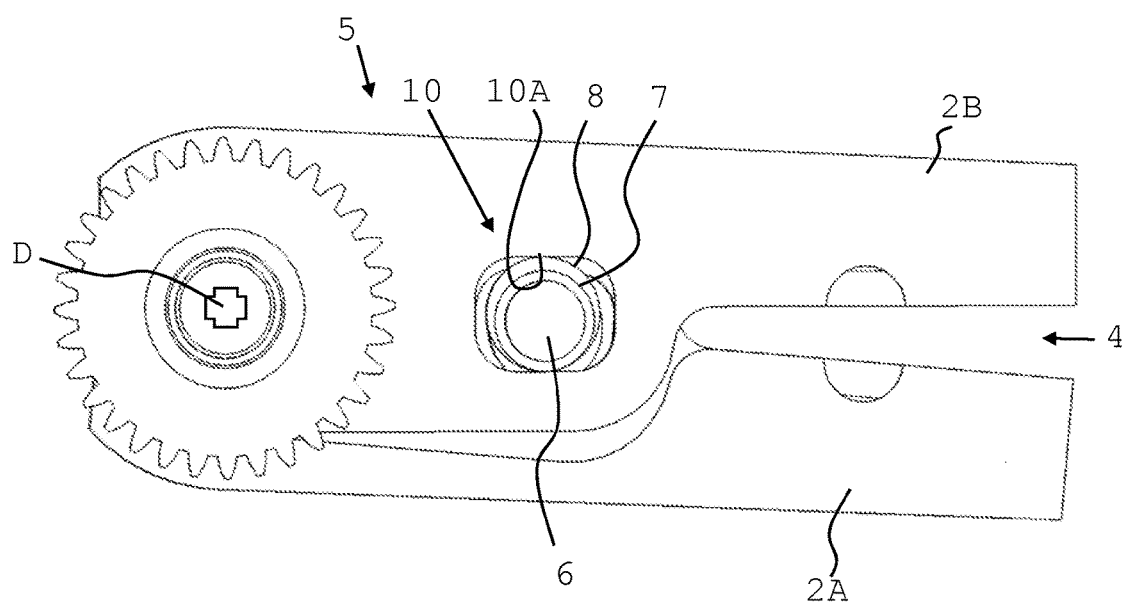
FIG. 9 is a schematic showing the transducer being part of the clamping jaws.

Another embodiment of the invention is shown in the FIGS. 7-9. According to this embodiment, both clamping jaws 2A, 2B are movably mounted about a common rotation axis R, so that they are movable with their clamping surfaces 3A, 3B at an angle towards each other and away from each other, and so that they cooperate with a gearing 5 which is configured for the synchronous opposed movability of both clamping jaws 2A, 2B (only one gear shown unnumbered) (see FIG. 7).

In other words, the two clamping jaws 2A, 2B, which execute a pincer movement in that both jaws 2A, 2B being rotatably mounted in the region of each first end on a common rotation axis R, so that their each second ends are moving towards or away from each other. These two second ends are therefore situated mutually at an angle, wherein this angle may also be zero. It is particularly preferred for it to become zero when the clamping gap 4 of the spoke (not shown) is firmly clamped.

The advantage of this design is mainly based on the fact that it is built significantly narrower. This is particularly desirable when closely spaced spokes must be tensioned (e.g. BMX bicycles or children's bicycles).

Also according to this embodiment, the device has clamping surfaces 3A, 3B which are displaceable in the direction of the longitudinal axis L of the clamping gap. As shown, they lie in supports 15 (shown only the rear one), which are movably mounted and which rest against the inner sides of the clamping jaws 2A, 2B (shown only the rear one). The clamping plates 3A', 3B' are held as insets in receptacles 15 and are linearly movable together with them. Such a construction is shown in FIG. 8.

According to this embodiment, the receptacles 15 are formed as a carriage, in which a recess adapted to the shape of spokes is present which extends along the longitudinal axis L of the clamping gap 4. The recess is a part of the clamping plate 3A', 3B'. In order for this carriage to take the high clamping forces on the one hand, and to slide along the longitudinal direction L on the other, they are resting or positioned on (in this case four) roller bearings 16 (only one is provided with reference numeral) into corresponding recesses of the clamping jaws 2A, 2B.

On the back of each carriage there is a centering device. It is used to run the carriage back in a center position. Without this centering device the carriage would slide down by gravity and therefore no longer allow the further movement of the clamped spoke in this direction. In the present case, the centering device is designed as a pair of magnets 17A, 17B. Due to the attractive forces of the magnets 17A, 17B they try to pull the carriage to the center position. It is clear that the centering device can also be designed differently. It can for example function by means of springs, which are disposed at the back or at the top and/or bottom of the carriage.

Because of the displaceability which is acting along the longitudinal axis L of the clamping gap 4, a tightly clamped spoke which is clamped, whereby its distal end relocates in or against the direction of the longitudinal axis, will actually move in this direction. The clamping surfaces 2A, 2B may thus, while avoiding additional measurement errors, act on the longitudinal axis of the spoke by preventing its rotation and thus torsion, while not hindering its translation and thus the forces that act in the spoke which are caused by the screwing process which is necessary for measurement and adjustment of the spoke. Thus, undesirable measuring errors are avoided.

According to another embodiment not shown, the clamping jaws are driven directly; a gear is unnecessary in this case. A fluidic gearing (hydraulic, pneumatic) does also not require a transmission of the type shown.

According to the embodiments shown in all figures, the gearing 5 includes an eccentric shaft 6 with a multitude of disengagement profiles 8 being alternating-eccentrically arranged to the core 7 (and therefore to the rotation axis R) of the eccentric shaft 6. The "core" 7 is a (imaginary) cylindrical base body of the eccentric shaft 6, from which disengagement profiles 8 protrude as part-circumferential elevations. Accordingly, it has a diameter 7' formed by the lowest sections (beginning and end) of disengagement profiles 8.

Figure 3:
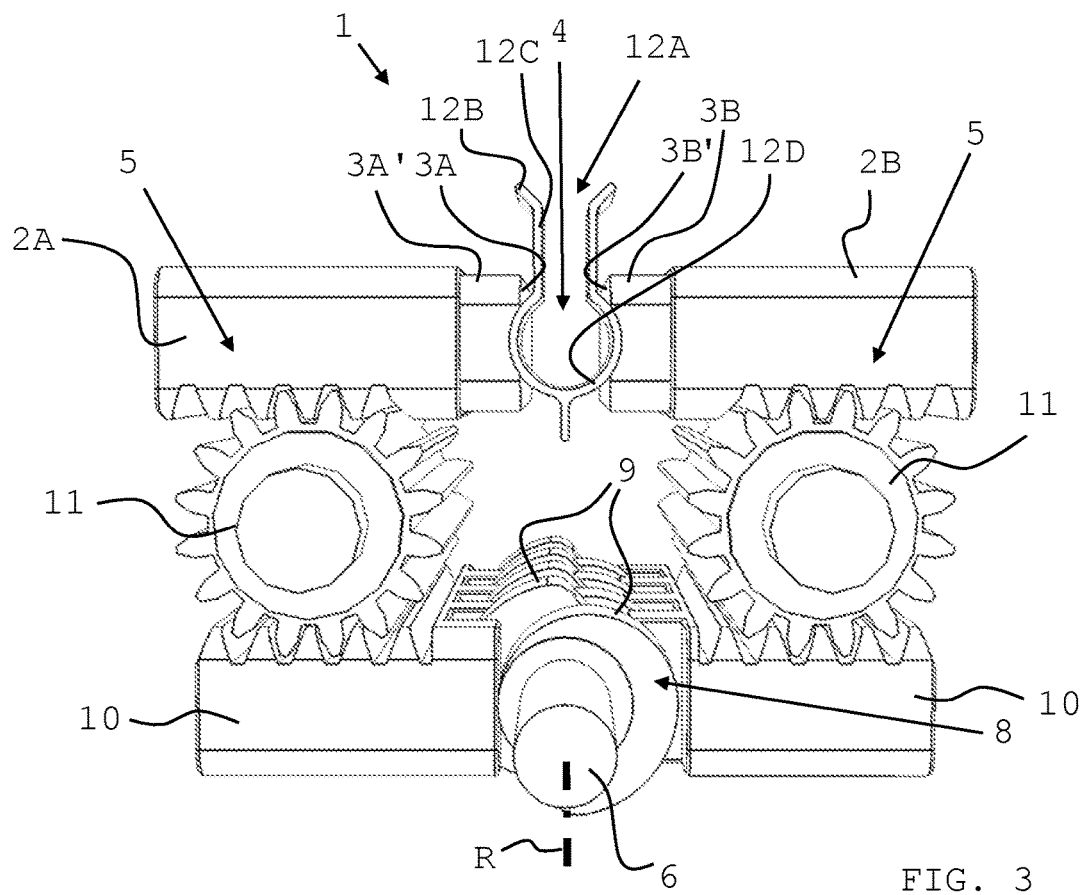
FIG. 3 is a schematic of a plan view of the device of FIG. 1.

The disengagement profiles 8 cooperate according to the embodiment shown in both FIGS. 1 to 3 and FIGS. 7 to 9 in turn with the transducer surfaces 10A, 10B of transducers 10 being arranged on both sides of the eccentric shaft 6, wherein according to the embodiment of FIGS. 1 to 3 the latter is mechanically coupled with the clamping jaws 2A, 2B such that the movements of the disengagement profiles 8 result in synchronously opposite (that is, opposite to the movement of the transducer 10, for example, anti-parallel) movement of the clamping jaws 2A, 2B (in FIG. 1 disengagement profiles without reference numerals, in FIG. 2 all disengagement profiles 10B, but only one disengaging profile 10A is provided with reference numerals). This may, as shown in the example of FIGS. 1 to 3, be achieved by the transducers 10 each comprising teeth that run parallel to the longitudinal direction L of the clamping gap 4, the teeth cooperating with a respective spur gear wheel 11, with which the movement of the transducer 10 is transferred to the clamping jaws 2A, 2B.

According to the embodiment of the FIGS. 7 to 9, the transducer 10 is part of the clamping jaws 2A and 2B, respectively (see in particular FIG. 9). The eccentric shaft 6 is passed through a bore in the jaws 2A and 2B, respectively, the walls of which forming sections of transducer surfaces 10A, 10B which come into contact with the disengagement profiles 8. The bores of the two clamping jaws 2A, 2B are aligned with one another, and the eccentric shaft 6 projects on both sides from the aforementioned bore (see FIG. 8), so that it can be supported at their ends (bearing not shown).

As shown particularly in FIG. 2, the sides of the transducer 10 level which face the eccentric shaft 6 have steps. The "peaks" of the steps are in contact with each second of the disengagement profiles 8 of the eccentric shaft 6; these are the actual transducer surfaces 10B. The "bases" of the steps, however, are sized so deeply that just no contact with one disengagement profile which is lying at the same height of the rotation axis R is established because this is indeed provided for contacting the straight opposite transducer. The particular advantage of this design lies in the uniform load of the eccentric shaft 6 and of the transducers 10 contacted by it.

According to more generally formulated embodiment, the transducer 10 is associated via tangential frictional rotating bodies (e.g. spur gears 11) with the clamping jaws 2A, 2B opposite to their direction of movement.

According to an embodiment not shown but also encompassed, transmission of movement of the transducer is carried out on the clamping jaws by means of a rocking lever construction. The transducers and/or clamping jaws can be effected either by means of frictional engagement (by merely transmitting compressive forces from the transducers on the rocking lever, or from the rocking lever on the clamping jaws), or a form closure may be implemented (e.g. by means of bolts as the swivel joints at the junctions between transducers and rocking levers, or rocking levers to the clamping jaws).

As illustrated in FIG. 3 which shows a plan view of an embodiment of the device, according to a preferred embodiment of the disengagement profiles 8, the same have an eccentric disengaging surface 9 along the circumference of the core 7 which is eccentric with respect to the rotation axis R of the core 7. The disengagement surfaces 9 are provided to cooperate with the transducer surfaces of the transducers (not shown). Also, the eccentric shaft 6 of the other embodiment of the device has these characteristics, wherein for the sake of clarity, not all reference numerals are present.

According to a particularly preferred embodiment, the sections of the transducer surfaces 10A, 10B take a coplanar position with the (then tangentially arranged) disengagement surfaces 9 of the disengagement profiles 8. "Sections" means that this tangential position must not be present in each rotational position of the eccentric shaft.

Figure 4:
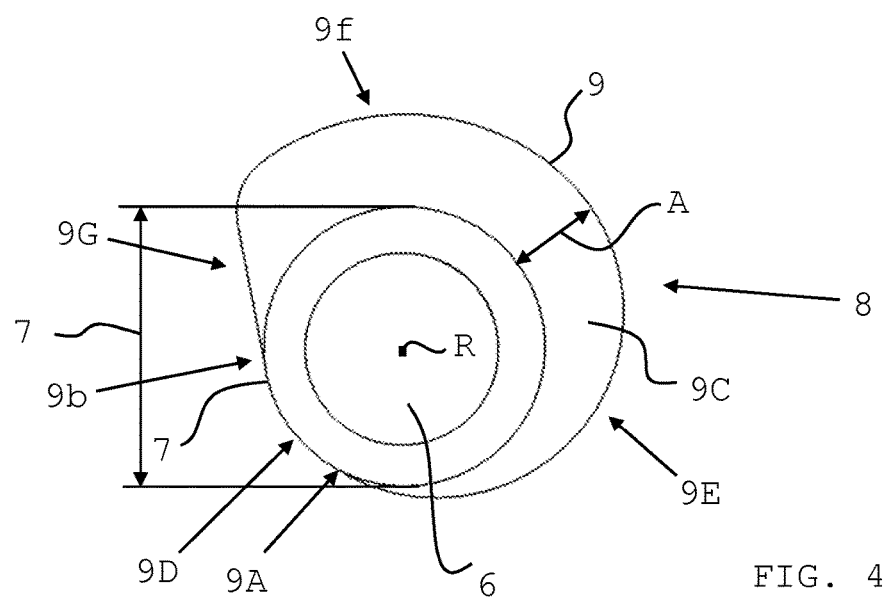
FIG. 4 is a schematic of a plan view of the eccentric shaft.

The FIG. 4 shows a plan view of the eccentric shaft alone depicted in an enlarged scale. Preferably, the begin 9A and end 9B of a disengagement profile 9 run tangential to the core 7 of the eccentric shaft 6, and the radial distance A of the disengagement surface 9 to the core 7 has a portion 9C with a greater distance along the circumference of the eccentric shaft 6 in the region between the begin 9A and the end 9B. This transition region 9C serves, by way of rotation of the eccentric shaft 6, to gradually enlarge the "effective" eccentric shaft diameter with regard to the respective transducer 10 (not shown), thus continuously disengaging the transducer 10, and vice versa.

Particularly preferably this is achieved by a first constant portion 9D which is present ahead of begin 9A, in which the disengagement surface 9 can tangentially abut the transducer surface (not shown, see FIG. 3). Then the distance A increases constantly (middle section of 9E). In a second constant section 9F, the distance A is at the same level again, so that the disengagement profile 9 can again tangentially abut the transducer surface (see FIG. 3). Finally, the disengagement surface 9 falls in an end portion 9G again back to the core 7. The disengagement surface 9 passes from the begin 9A to the end 9B a central angle of for example not more than 330 degrees (the maximum possible is 360 degrees). The other remaining e.g. 30 degrees form the first constant section 9D.

In other words, the disengagement profile 8 has two steps along the circumference, wherein the first step is located on the circumference of the core 7, and the second step is spaced apart from the same, so that in the area of both steps a tangential abutting of the disengagement profiles 8 with the transducer surfaces 10A, 10B is enabled, and wherein between the first and the second step a non-abrupt transition region 9C is arranged.

By means of such construction it is achieved that in the areas of constant distance A (the first and the second constant section 9D and 9F) a self-locking of the disengagement movement is carried out, in particular in the clamping maximum.

Moreover, as it is shown in the FIG. 1 to FIG. 3, the device may further comprise an insertion aid for the spoke 12 (not shown). These may be located in the proximal and/or distal extension of the clamping gap 4; it is closer to a hub (as it is shown in FIGS. 1 to 3, if it is assumed that in the FIG. 1 there is a spoke nipple arranged below the device) or closer to a spoke nipple (hub and spoke nipple are not shown, respectively).

The spoke is moved into the adjustment support 12 by means of the outwardly directed and elastically movable receiving surfaces 12B of the insertion opening 12A and the gap surfaces 12C (only one provided with a reference numeral) of the insertion gap (without reference numeral), which are spaced apart less than the spoke diameter and which are of equal flexibility, the adjustment support 12 being limited by an radial surface 12D which runs axially centered to the clamping surfaces 3A, 3B. Thus, the spoke axis is clamp-like and centrally positioned to the clamping surfaces 3A, 3B for the clamping operation, wherein the insertion opening 12A of the adjustment support 12 may also be configured in other ways, e.g. by means of a tapered gap.

In this way, a spoke, which passes through the insertion opening 12A in the adjustment support 12, is brought in the proper position suitable for fixation simply by abutting against the radial surface 12D relative to the clamping surfaces 3A, 3B, or the device itself is positioned relative to the spoke so that the spoke can take the described position.

It is clear that also the other embodiment of the device according to the invention may have such an insertion aid.

Figure 5:
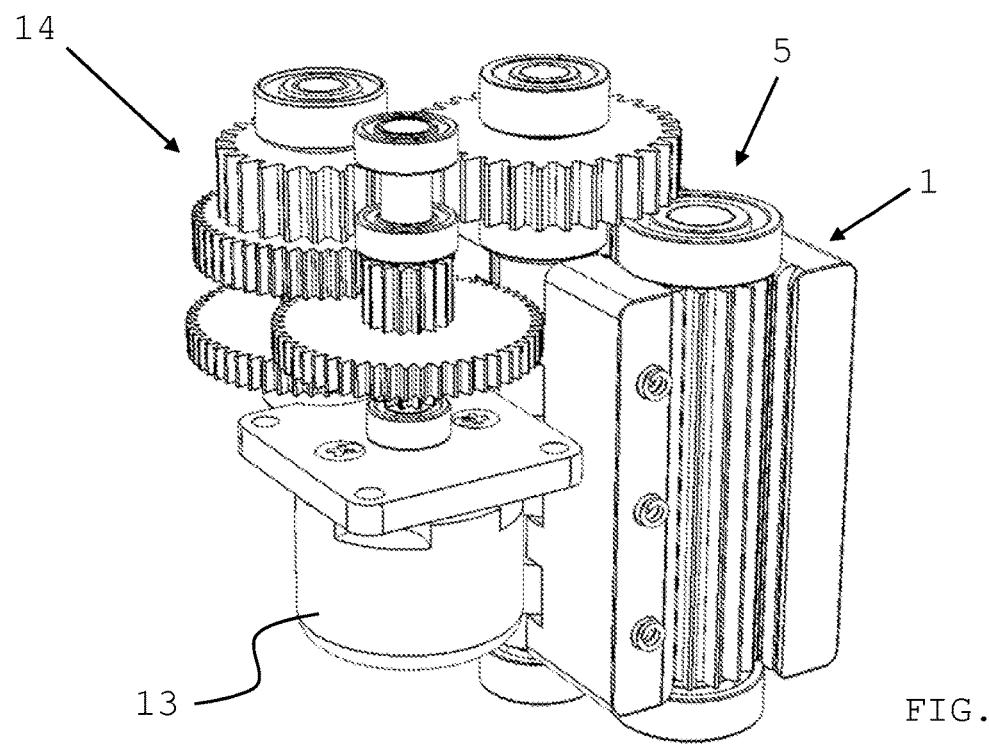
FIG. 5 is a schematic showing the device of FIG. 1 with further components.

In FIG. 5, the embodiment which is shown in the preceding figures is depicted with further components (gears of a transmission, bearings); the already introduced reference numerals are partially omitted. Accordingly, the device also includes a drive 13, which directly or, as shown, indirectly (by means of transmission 14 and the gearing 5) cooperates with the clamp 1. The drive 13 is preferably an electric motor, but may also be a hydraulic or pneumatic pump.

In FIG. 5 the springs are also visible which are used to press the transducer against the eccentric shaft to ensure permanent optimum contact.

Alternatively, such drive is coupled to the device by means of a suitable interface (not shown); so, the device may use an already existing drive of another component which is part of a device provided for centering or tension optimization (e.g. automatic centering device).

Figure 6:
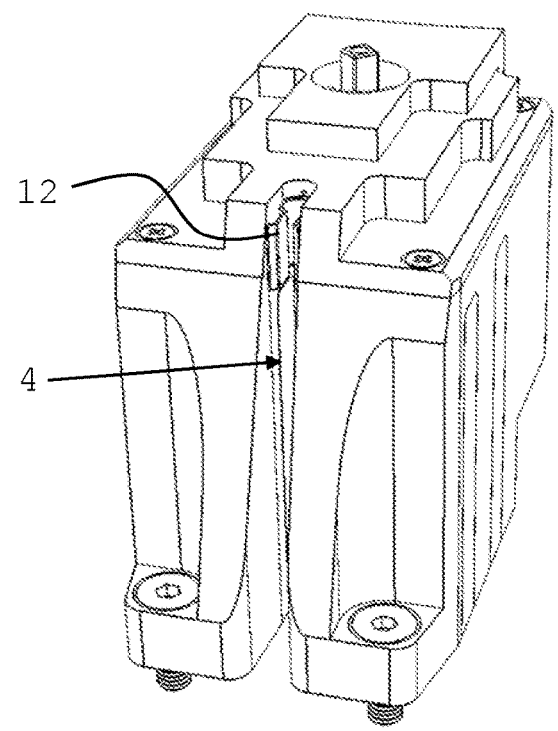
FIG. 6 is a schematic showing the device of FIG. 1 with a surrounding housing.

In the FIG. 6 the first embodiment of the device is shown obliquely from the front with a surrounding housing. In the foreground, an opening is visible which contains the clamping gap 4 and the insertion aid 12.

Figure 10:
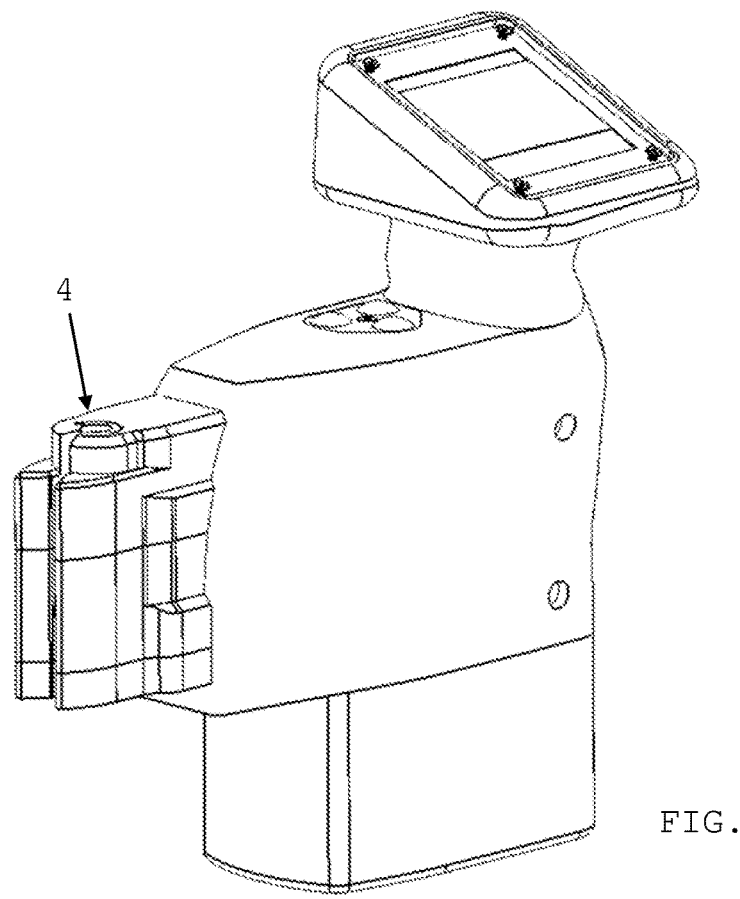
FIG. 10 is a schematic showing the device of FIG. 7 within a surrounding housing.

In FIG. 10 the second embodiment of the device is shown with the housing. Front left in the picture is the clamping gap 4. Above, a display and control elements are present, and in the lower part, the batteries (not visible) are housed.

The invention also relates to equipment for automatically building and/or centering running wheels, and/or for adjusting the tension of their spokes, which includes the device described above for fixing the spoke. In other words, the invention extends not only on the device for fixation itself, but also to apparatuses and systems for general automated tensioning of spokes, and which include the device according to the invention or make use of the feature of the invention. For example, this may be facilities for lacing or centering running wheels, or facilities with which the spoke tension is optimized (adjusted) to obtain a wheel of higher quality. The term "automated" or "automation" as used herein refers to that except for an introduction of the running wheel into the device, essentially, no manual intervention of the user is needed any more. Such equipment typically includes a drive for rotating the running wheel, a device for measuring the tension of the spokes, an automated nipple screw mechanism, as well as the device according to the invention for fixing the spoke. The components are arranged in a frame or the like, in which the running wheel is clamped, and then automatically processed.

In other words, the device according to the invention is well suited to complement conventional devices of the type described, for example, a device according to the aforementioned publication WO 2006 114 087 A2.

According to another embodiment, the invention also relates to a device for semi-automatic adjusting of the spoke tension of running wheels. The term "semi-automatic" as used herein refers to the manual intervention of a user is also required. Such methods use the device described above for fixing a spoke, as well as a measuring device for measuring the spoke tension and an automated nipple screw mechanism. A frame in which the running wheel is clamped, or a drive for the running wheel rotation, is typically not required; however, it is optional. The device is preferably held by hand and manually set on the nipple of the spoke to adjust it. Only the subsequent steps of measuring, calculating of the necessary spoke nipple rotations, as well as performing the respective screwing movements (with previous fixation of the spoke) are performed automatically.

The invention also relates to a method for adjusting the tension of running wheel spokes, which includes automated turning of a spoke nipple, and further, prior to the automated turning, a fixing of the spoke which is connected to this spoke nipple takes place such that the spoke is fixed in rotation direction around its longitudinal axis at least along a spoke section, thereby preventing rotation. The method ensures that the effort for determining the rotations which are necessary to achieve a given spoke tension is minimized, since no compensation movements before determining the spoke tension are necessary, and no time-consuming computations are required, because a simple automatic tension calculation only needs to take into account the parameters of the thread friction and of the torque, as known from the aforementioned document WO 2006 114 087 A2.

According to the invention movement of the spoke in the direction of its longitudinal axis is possible during (and in spite of) fixing. When tightened, the spoke moves with its distal end into the nipple or out of it, respectively. Thus, the spoke is either stretched or relaxed by tightening, and thus, shortened or lengthened; the closer a point of the spoke is to the nipple, the longer is its longitudinal movement. Also, the fixation is preferably as close to the distal end of the spoke (and thus the nipple) as possible, which performs upon tensioning just the maximum motion in the longitudinal direction of the spoke. If the spoke would be fixed not only in rotation, but also along the longitudinal axis by way of the fixation, the short tail would be greatly stretched or relaxed between fixed region and the screwed-in end, whereas the (typically much longer) section between fixation and proximal (hub-faced) end does not or only slightly perform this length compensation. However, if the fixed portion is movable in longitudinal direction, thus allowing movement of the spoke in the direction of its longitudinal axis, the entire spoke is extended or shortened according to the change of its tension, which is advantageous; reference is made to the above explanations.

The method according to the invention can advantageously be used regarding all work on running wheels, where a correction of tension of at least one spoke is necessary.

Thus, the method according to the invention can be carried out for example as a part of the centering of running wheels, in that prior to fixing of the spoke, the method includes measuring the lateral and/or radial runout of the running wheel at least at the position of the spoke nipple. In addition, according to the invention, before or during the fixing, but before the automated turning (e.g. adjustment of the spoke tension), initially determining the rotations of the spoke nipple is performed to reduce the lateral or radial runout (calculation). During fixation (i.e. during the fixing of the spoke) the automated turning is then carried out in accordance with the previously performed determination. In other words, between the known steps of measuring the rim deformation and the rotation of the spoke nipple, the spoke is rotationally fixed while being longitudinal axially mobile, so it can not rotate during the subsequent rotation of the spoke nipple, but can move in a longitudinal axial direction.

It is clear that after the spoke tension adjustment, the adjacent spoke is then adjusted using the method according to the invention; the device may have a corresponding drive for the running wheel for this purpose. A wheel can be centered in one or more runs; it can be worked on only in a predetermined region, or the equipment choses automatically a region the lateral or radial runout of which is not within a predetermined deviation.

Most preferably, measurement of the spoke tension is carried out by means of measurement of the torque which is required for rotating the spoke nipple that is associated therewith, for example via the power which is required by a drive.

Preferably, before the actual turning for the adjustment, a short "free-off" of the nipple is carried out, wherein the same is turned a bit, for example, half a turn, in one or both directions. If the spoke is not yet fixed, at least a breaking off of the possibly firmly corroded nipple from the rim takes place. If the spoke is fixed, additionally, breaking off of a possible firmly corroded connection between nipple and spoke takes place.

By performing "free-off" of the screw connection, possibly existing torsion is also removed to obtain a reliable starting position of the nipple for a measurement of the spoke tension. For example, with a standard rotation of 60°-120° the spoke is relaxed at first, then it is fixed, and tensioned again according to the standard at 60°-120°. Then, measurement of the actual as well as determining the desired spoke tension is performed, and subsequently, the desired spoke tension is approached.

Also, the method according to the invention can be carried out in the context of semi-manual or automatic tension-optimization of the running wheel. At first the measurement of the real tension of this spoke is performed. This measurement can be made by means of known methods (e.g. sound analysis), as well as by the above-described motor current method, wherein possibly an (advance-) fixing according to the invention of the spoke can be useful. After measuring, but however, before turning, a determination (calculation) of the number of revolutions, being necessary for reaching a predetermined tension, of a spoke nipple which is connected to the spoke is then carried out. While turning this spoke nipple for adjusting the tension of the spokes, the spokes are then fixed according to the invention.

Such a process is possible in a fully automatic and a semi-manual variant. In the semi-manual variant, a device which comprises a measuring device, the device for fixing according to the invention, and an automatic turning device, is held in hand and initially positioned so that the spoke is positioned in the clamping gap and the means for automatic turning is positioned on the respective nipple. A holding frame or alike is not necessary. Then the equipment carries out the automated steps according to the invention. It is then manually placed on the next spoke until all the spokes of a running wheel are adjusted.

In the fully automatic version, the device is mounted on a frame, and the running wheel is rotated by a drive in the different positions. The device can also automatically move towards and away from the spoke. The switching between the individual spokes and nipples is thus also automatic.

It is clear that here as well the measurement of the spoke tension and the free-off can be carried out as described above.

Especially preferred, the device according to the invention is used for the spoke fixing in accordance with the description above. However, the process is also usable in the same way for differently built devices which are suitable for the fixation of spokes and which are fitted within a corresponding equipment.

As detailed, the invention solves the tasks assigned to it. With its help the working result is further improved, and the loss of time and the computational complexity with respect to the steps of the compensation movement described above can be significantly reduced.

LIST OF REFERENCES

1 clamping means
2A, 2B clamping jaw
3A, 3B clamping surface
3A', 3B' clamping plate
4 clamping gap
5 gearing
6 eccentric shaft
7 core
7' diameter
8 disengagement profile
9 disengagement surface
9A begin
9B end
9C region (with greater distance), transition region
9D first constant section
9D initial section
9E middle section
9F second constant section
9G end section
10 transducer
10A, 10B transducer surface
11 wheel
12 adjustment support, insertion aid
12A insertion opening
12B receiving surface
12C gap surface
12D radial surface
13 drive
14 transmission
15 support
16 roller bearing
17A, 17B magnet
L longitudinal axis
R rotation axis
A distance

What is claimed is:

1. A device for fixing a spoke for trueing a wheel, the device comprising a clamp (1) with clamping surfaces (3A, 3B) movable along a longitudinal (L) direction and towards one another to form a clamping gap (4) of variable width that is configured to receive a section of the spoke, wherein driving the clamp (1) narrows the clamping gap (4) so that the section of the spoke can be fixed via force-fitting and/or form-locking, further wherein the clamping surfaces (3A, 3B) rotationally fix the section while permitting movement of the section in the longitudinal direction (L) towards the spoke's distal end during rotation of a spoke nipple.

2. The device according to claim 1, wherein the clamp (1) comprises two clamping jaws (2A, 2B) which respectively have the clamping surfaces (3A, 3B), wherein the clamping jaws (2A, 2B) are spaced apart with their clamping surfaces (3A, 3B) forming the clamping gap (4).

3. The device according to claim 2, wherein both clamping jaws (2A, 2B) are linearly moveable and supported in such a manner that they can be moved in parallel towards, and away from, each other with their clamping surfaces (3A, 3B), and cooperate with gearing (5) that is configured for the synchronous-opposite movability of both clamping jaws (2A, 2B).

4. The device according to claim 3, wherein the gearing (5) comprises an eccentric shaft (6) with a multitude of disengagement profiles (8) being alternating-eccentrically arranged to a core (7) of the eccentric shaft (6), the disengagement profiles (8) cooperating with transducer surfaces (10A, 10B) of two transducers (10) which are bi-laterally arranged with respect to the eccentric shaft (6), wherein the transducers (10) are mechanically coupled to the clamping jaws (2A, 2B) such that their movements result in synchronous-contrary movements of the clamping jaws (2A, 2B).

5. The device according to claim 4, wherein along the circumference of the core (7), the respective disengagement profiles (8) have a disengagement surface (9) which lies eccentric to the rotation axis (R) of the core (7).

6. The device according to claim 2, wherein both clamping jaws (2A, 2B) are movably supported around a common rotation axis such that they are moveable at an angle towards, and away from, each other with their clamping surfaces (3A, 3B), and cooperate with gearing (5) which is configured for the synchronous-opposed movability of both clamping jaws (2A, 2B).

7. The device according to claim 1, further comprising a drive (13), which directly or indirectly cooperates with the clamp (1).

8. Equipment for the automatic building and/or trueing of wheels and/or for the adjusting of the tension of their spokes, comprising a device for fixing a spoke according to claim 1.

9. Equipment for the semi-automatic adjusting of the tension of wheel spokes, comprising:
the device for fixing a spoke according to claim 1;
a device for measuring spoke tension; and
an automated nipple screwing mechanism.

10. A method for adjusting tension of wheel spokes, comprising:
providing the device according to claim 1,
fixing a spoke that is connected to a spoke nipple in rotation direction around its longitudinal axis at least along a spoke section and permitting movement of the spoke longitudinally; and
turning the spoke nipple using automation.

11. The method according to claim 10, wherein prior to fixing the spoke, the method further comprises measuring a side and radial runout at least at the position of the spoke nipple, further wherein prior to or during the fixing the spoke, but prior to the automated turning, a number of spoke nipple revolutions necessary for reducing the respective side or radial runout is determined, and in that during the fixing, the automated turning according to the previously carried out determination takes place.

12. The method according to claim 10, further comprising measuring the tension of the spoke, and determining the number of revolutions of the spoke nipple connected to the spoke that is necessary for reaching a predetermined tension prior to the automated turning.

13. A device for fixing a spoke for trueing a wheel, the device comprising:
a clamp (1) with a clamping gap (4) of variable width and a longitudinal axis (L) configured to receive a section of the spoke, wherein driving the clamp (1) narrows the clamping gap (4) so that the section of the spoke can be fixed via force-fitting and/or form-locking, further wherein the device rotationally fixes the section but permits movement of the section in the longitudinal direction;
two clamping jaws (2A, 2B) each respectively have clamping surfaces (3A, 3B), wherein the clamping jaws (2A, 2B) are spaced apart with their clamping surfaces (3A, 3B) forming the clamping gap (4) and are linearly moveable and supported in such a manner that they can be moved in parallel towards, and away from, each other with their clamping surfaces (3A, 3B), and cooperate with a gearing (5); and
gearing (5) configured for the synchronous-opposite movability of both clamping jaws (2A, 2B) and includes an eccentric shaft (6) with a multitude of disengagement profiles (8) being alternating-eccentrically arranged to a core (7) of the eccentric shaft (6), wherein the disengagement profiles (8) cooperating with a transducer surfaces (10A, 10B) of a two transducers (10) which are bi-laterally arranged with respect to the eccentric shaft (6), wherein the transducers (10) are mechanically coupled to the clamping jaws (2A, 2B) such that their movements result in synchronous-contrary movements of the clamping jaws (2A, 2B).

14. The device according to claim 13, wherein along the circumference of the core (7), the respective disengagement profiles (8) have a disengagement surface (9) which lies eccentric to the rotation axis (R) of the core (7).

15. A device for fixing a spoke for trueing a wheel, the device comprising a clamp (1) with a clamping gap (4) of variable width and a longitudinal axis (L) configured to receive a section of the spoke, wherein driving the clamp (1) narrows the clamping gap (4) so that the section of the spoke can be fixed via force-fitting and/or form-locking, further wherein the device simultaneously rotationally fixes the section and permits movement of the section in the longitudinal direction (L) towards the spoke's distal end during rotation of a spoke nipple.

\* \* \* \* \*